T. S. SMITH.
Fertilizer-Distributer and Seed-Planter.

No. 213,303.    Patented Mar. 18, 1879.

WITNESSES
Robert Everett
H. Clay Smith

INVENTOR.
Thomas S. Smith
By Gilmore, Smith & Co.
ATTORNEYS.

N. PETERS, PHOTO-LITHOGRAPHER, WASHINGTON, D.C.

UNITED STATES PATENT OFFICE.

THOMAS S. SMITH, OF RUTLEDGE, GEORGIA.

IMPROVEMENT IN FERTILIZER-DISTRIBUTER AND SEED-PLANTER.

Specification forming part of Letters Patent No. 213,303, dated March 18, 1879; application filed February 17, 1879.

*To all whom it may concern:*

Be it known that I, THOMAS S. SMITH, of Rutledge, in the county of Morgan and State of Georgia, have invented certain new and useful Improvements in Fertilizer - Distributer and Seed - Planter; and I do hereby declare that the following is a full, clear, and exact description of the construction and operation of the same, reference being had to the annexed drawings, making a part of this specification, and to the letters and figures of reference marked thereon.

Figure 1:
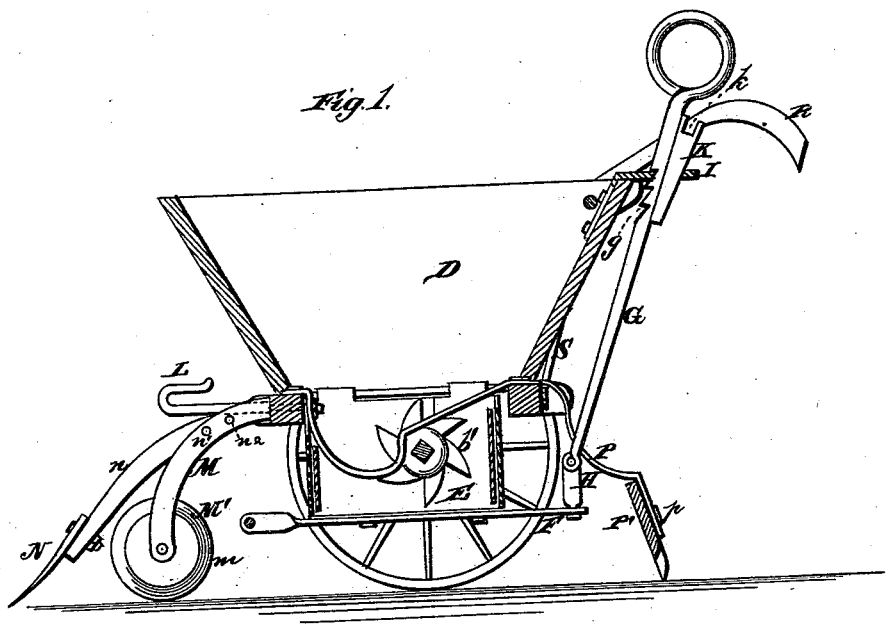
Figure 2:
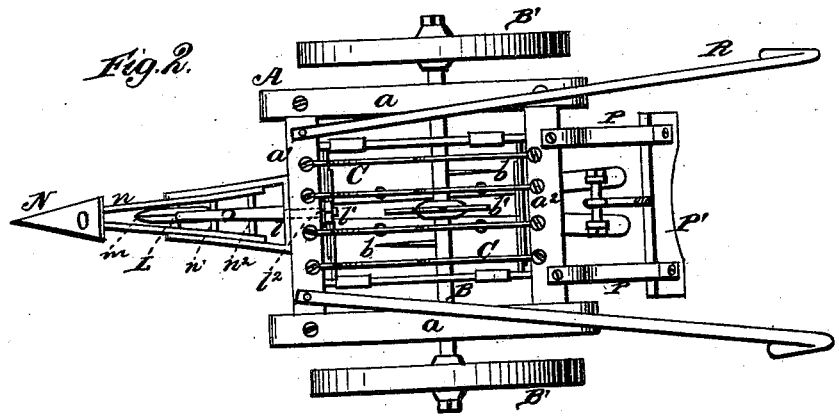
Figure 3:
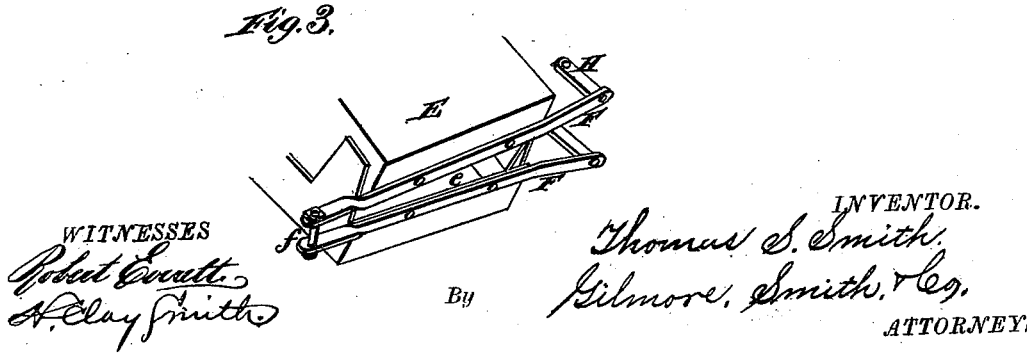

Figure 1 of the drawings is a representation of a longitudinal central section. Fig. 2 is a plan view, and Fig. 3 is a perspective detail view.

My invention relates to a device which may readily be changed to a seed-planter or fertilizer-distributer at will, and serve efficiently in either capacity; and the novelty consists in the construction and arrangement of parts, as will be more fully hereinafter set forth.

The invention is designed as an improvement upon the device patented to myself and C. C. Boyle April 23, 1878, No. 202,878, for a similar purpose.

In carrying out my invention I employ an ordinary frame in which is journaled an axle, the greater part of which is square, triangular, or polygonal, and upon which are hung rigid wheels, as shown. Rigidly secured to this axle are curved cutting-knives, which, operating through a framing that supports the fertilizer and in a feed-box below such frame, serve to pulverize the fertilizer by the automatic power received from the locomotion of the device. The feed-box is provided with an adjustable feed-mouth in its central longitudinal bottom, rendered thus adjustable by feed-bars pivoted at their forward ends to each other, each being connected by a link at the rear end to a hand-lever having notches, which lever operates in a guide-plate upon the hopper, being adapted to be secured therein at any notch desired by means of a wedge-key, as shown. As this hand-lever is depressed it forces the mouth of the feed-box open, and a toothed feeder revolving with the axle and operating in the feed-box adjacent to the mouth insures even and certain feeding of the fertilizing material. The notches in the hand-lever are graduated, so as to feed a certain quantity of material to the acre, and this may be increased or diminished at will by raising or lowering the hand-lever, which is arranged convenient to the operator.

From the forward cross-bar of the frame extends a bifurcated metal frame curved so as to extend forward and downward, and in the forward extremity is journaled the axle of a furrow-wheel having a V-shaped periphery, and between the bifurcated arms are bolted the shanks of a plow or opener, which precedes the furrow-wheel and opens the furrow or drill. This opener is used when the device is employed in seed-planting, and may be disconnected or turned out of operation, the back bolt acting as a pivot. The furrow-wheel follows the opener in seed-planting and packs the furrow upon every side into a V shape, and insures the seed falling into the bottom thereof at an even depth, and it serves as a forward riding-wheel in distributing fertilizers, the opener being elevated out of operation. This forward frame is secured to the main frame by means of the draft-hook which passes through the transverse body of the frame, a shoulder bearing against the outer surface thereof through the main frame, and a securing-nut is screwed upon the projecting threaded inner end.

The wedge-key which locks the hand-lever within the guide-plate has a proper aperture near one end which adapts it to be used as a wrench upon the wheel-nuts and other nuts about the device.

Upon spring-arms which extend outward and backward from the main frame is secured an adjustable coverer, as shown.

The device is provided with an ordinary hopper above the feed-box, the bottom of which is formed by the guide-rods through which the cutting-knives operate; and with proper handles and braces, as shown.

Referring to the drawings, A represents the main frame, having side bars $a$, front cross-bar, $a^1$, and rear cross-bar, $a^2$. In the side bars $a$ is journaled an axle, B, upon which are rigidly hung wheels B', and it is provided with cutting-knives $b$ and a central toothed feeder, $b'$, as shown. These knives and the feeder operate in their revolutions between longitudinal rods C, which form a floor to the hopper D, upon which the fertilizer rests, said rods C being located below the hopper and in a feed-box, E, having feed-mouth $e$, as shown. This feed-mouth is adjustable by means of feed-bars F, pivoted to each other at $f$, at their forward ends, and being connected to a hand-lever, G, having notches $g$, by means of links H at their rear ends. The lever G operates through a guide-plate, I, upon the hopper D, and a wedge-key, K, having nut-bearing $k$, locks the lever therein at any desired point, as shown.

By this construction I use but one shaft or axle, do away with all connecting-gear, and am enabled to feed more or less material to the acre at will by opening or closing the mouth of the feed-box, as is obvious.

To the front cross-bar, $a^1$, I secure, by means of the draft-hook L, having shoulder $l$, threaded portion $l^1$, and nut $l^2$, a bifurcated frame, M, as shown, in which is journaled a furrow-wheel, M', having a V-shaped periphery, $m$, and between the arms of this frame are bolted the shanks $n$ of a plow or opener, N, which may be elevated out of operation by disconnecting the bolt $n^1$ and allowing the opener to pivot upon the bolt $n^2$, as shown. The draft-hook L thus not only serves its proper function as a draft-hook to the device, but, passing through the perforated transverse body of the frame M, secures both furrow-wheel and opener securely to the main frame A, as shown.

From the rear cross-bar, $a^2$, spring-arms P extend backward and downward, and carry a coverer, P', secured to said arms by means of screws $p$.

Handles R and braces S, of ordinary construction, are provided, and such other well-known devices as tend to assist in the efficiency of the device may be employed.

I claim—

1. The combination of the frame M, provided with furrow-wheel M' $m$, and secured to the front cross-bar, $a^1$, of the frame A by the draft-hook L, having shoulder $l$, threaded portion $l^1$, and nut $l^2$, with the bifurcated shank $n$ of the opener N, said shank $n$ being connected to the frame M by bolts $n^1$ $n^2$, substantially as and for the purposes set forth.

2. The feed-box E $e$ and feeder $b'$, in combination with feed-bars F $f$, links H, lever G, having notches $g$, guide-plate I, and wedge-key K, as set forth, for the purpose described.

In testimony that I claim the above I have hereunto subscribed my name in the presence of two witnesses.

THOMAS S. SMITH.

Witnesses:
JAMES J. SHEEHY,
H. CLAY SMITH.